United States Patent [19]

Huber

[11] Patent Number: 5,321,707
[45] Date of Patent: Jun. 14, 1994

[54] REMOTE PUMPING FOR ACTIVE OPTICAL DEVICES

[75] Inventor: David R. Huber, Warrington, Pa.

[73] Assignee: General Instrument Corporation, Hatboro, Pa.

[21] Appl. No.: 919,920

[22] Filed: Jul. 27, 1992

[51] Int. Cl.$^5$ ............................................. H01J 3/30
[52] U.S. Cl. ........................................ 372/6; 385/142; 385/122
[58] Field of Search ................. 385/142, 122; 372/6; 359/173, 160

[56] References Cited

U.S. PATENT DOCUMENTS

| | | | |
|---|---|---|---|
| 5,050,949 | 9/1991 | DiGiovanni et al. | 372/6 X |
| 5,131,069 | 7/1992 | Hall et al. | 372/6 X |
| 5,140,456 | 8/1992 | Huber | 372/6 X |
| 5,185,814 | 2/1993 | Healey | 359/160 |

Primary Examiner—John D. Lee
Assistant Examiner—Stephen W. Barns
Attorney, Agent, or Firm—Barry R. Lipsitz

[57] ABSTRACT

Optical amplifiers and other active optical components along a signal distribution path are remotely pumped by a common pump laser. The pump energy can be transmitted over the signal path or over a separate pump path. Pumping of rare earth doped optical fiber amplifiers, such as erbium doped fiber amplifiers is illustrated. The pump energy can be provided at about 1480 nanometers to take advantage of reduced attenuation at this wavelength along the fiber path.

10 Claims, 3 Drawing Sheets

REMOTE PUMPING FOR ACTIVE OPTICAL DEVICES

BACKGROUND OF THE INVENTION

The present invention relates to optical fiber communication systems, and more particularly to apparatus for remotely pumping active optical devices such as optical amplifiers and lasers distributed along an optical fiber communication path.

Optical fiber communication systems are well known. Such systems are enjoying increasing use in the telecommunications industry, in the cable television industry, and in local area networks used to couple personal computers and/or workstations together.

In the cable television industry, signal distribution via coaxial cable has dominated to date. Such systems are typically arranged in tree and branch networks, and require a large number of high bandwidth electrical amplifiers to amplify the program signals in the distribution path. In a coaxial cable system, on the order of 40 amplifiers may be required between the cable system headend and an individual subscriber's home.

Optical fiber distribution systems also require the amplification of the signal along the distribution path. Prior to the widespread availability of efficient optical amplifiers, many systems converted the optical signals into electrical signals for amplification by conventional electrical amplifiers. The amplified electrical signals were then reconverted to the optical domain, for further distribution along the optical communication path. The advent of reliable and low cost optical amplifiers has obviated the need to convert signals into the electrical domain for amplification. However, some types of optical amplifiers, such as rare earth doped optical fiber amplifiers, require a source of pump energy. In a rare earth doped optical fiber amplifier, for example, a dedicated pump laser is coupled to the doped fiber for exciting the active medium (rare earth element) within the amplifier. At the same time, a communication signal is passed through the doped fiber. The pumped fiber exhibits gain at the wavelength of the communication signal, providing the desired amplification.

One disadvantage of the use of pumped optical amplifiers is that electrical energy must be provided at the amplifier location in order to operate the pump laser. This requires the distribution plant to include expensive power supplies and an associated power distribution system similar to that which was required in prior art coaxial cable systems and fiber systems using electrical amplification. The need for remote power supplies increases the cost and decreases the reliability of the system.

It would be advantageous to provide an optical fiber communication system that provides the necessary signal amplification or other active optical function along the signal distribution path without requiring electrical power at the site of each active optical component. It would be further advantageous to provide such a system that uses highly reliable and efficient, low cost active devices, such as optical amplifiers, along the optical communication path. The present invention provides apparatus for distributing signals over an optical fiber communication path which enjoys the aforementioned advantages.

SUMMARY OF THE INVENTION

In accordance with the present invention, apparatus is provided for distributing signals over an optical fiber communication path. The apparatus provides remote pumping of one or more active optical devices, such as optical amplifiers, along the communication path. More specifically, means are provided for coupling an optical information signal to the communication path for distribution over the path. An optical amplifier is provided within the communication path. A pump source is situated at a remote location from the optical amplifier. Means are provided for coupling the remotely located pump source to the communication path for outputting pump energy to excite the optical amplifier. The pump energy travels over the communication path to reach the optical amplifier. In a large distribution system, such as a tree and branch network, a plurality of optical amplifiers can be spaced along the communication path for remote pumping by the pump source.

In an illustrated embodiment, the optical amplifiers are rare earth doped optical amplifiers, such as erbium fiber amplifiers. In a preferred embodiment, the pump energy has a wavelength of about 1480 nanometers, which provides good resistance to attenuation along the fiber path.

In order to increase system reliability and reduce maintenance costs, it is advantageous to couple the information signal and the pump source to the communication path at a common site. For example, when the invention is used in connection with a cable television system, the pump source can be coupled to the communication path at the headend which provides the television program signals.

Operation of such a system is enhanced by providing one or more optical isolators in series with the optical amplifiers. Preferably, at least one optical isolator is provided in series with each optical amplifier, to prevent the optical amplifier from lasing.

A pump filter is provided after the final amplifier in each distribution run to remove the remaining pump energy prior to forwarding the communication system to a receiver.

In another embodiment, the pump energy is distributed using a separate pump path. In such an embodiment, means are provided for coupling an optical information signal to a communication path for distribution. An optical amplifier or other active optical device is provided within the communication path at a remote downstream location from the coupling means. A pump source is situated at a remote location from the active optical device for outputting pump energy to excite the active optical device. An optical fiber pump path is provided which is separate from the communication path. The pump path runs from the pump source to the active optical device, e.g., optical amplifier, and has a first end coupled to the pump source and a second end coupled to pump the active optical device. The pump energy travels over the pump path to reach the remotely situated active optical device.

Where necessary, a plurality of optical amplifiers and/or other active devices are spaced along the communication path for remote pumping by the pump source via the pump path. In a preferred embodiment, the communication path and pump path originate at a common site, such as a cable television headend. In this instance, the pump path can parallel the communication path. As in the first embodiment, the active optical devices can comprise rare earth doped optical amplifiers such as erbium doped fiber amplifiers. The use of pump energy having a wavelength in the region of 1480 nanometers is preferred to limit the attenuation of the pump energy. The pump energy is filtered from the information signal downstream from the amplifier(s) to remove remaining pump energy therefrom prior to reception of the information signal by a receiver.

DETAILED DESCRIPTION OF THE INVENTION

In optical telecommunication systems, it is desirable to include only passive components in the trunk and distribution system. However, it is usually necessary to provide optical amplifiers and/or other active devices such as lasers along the optical signal path to amplify or otherwise process the optical signal. The use of remote active optical devices has required local power to be provided at the site of the remote device, e.g., for energizing a pump laser used in connection with an optical amplifier. The present invention provides a remote pumping scheme for optical amplifiers and the like that are provided along a distribution path. Such paths can be many miles or kilometers in length.

Figure 1:
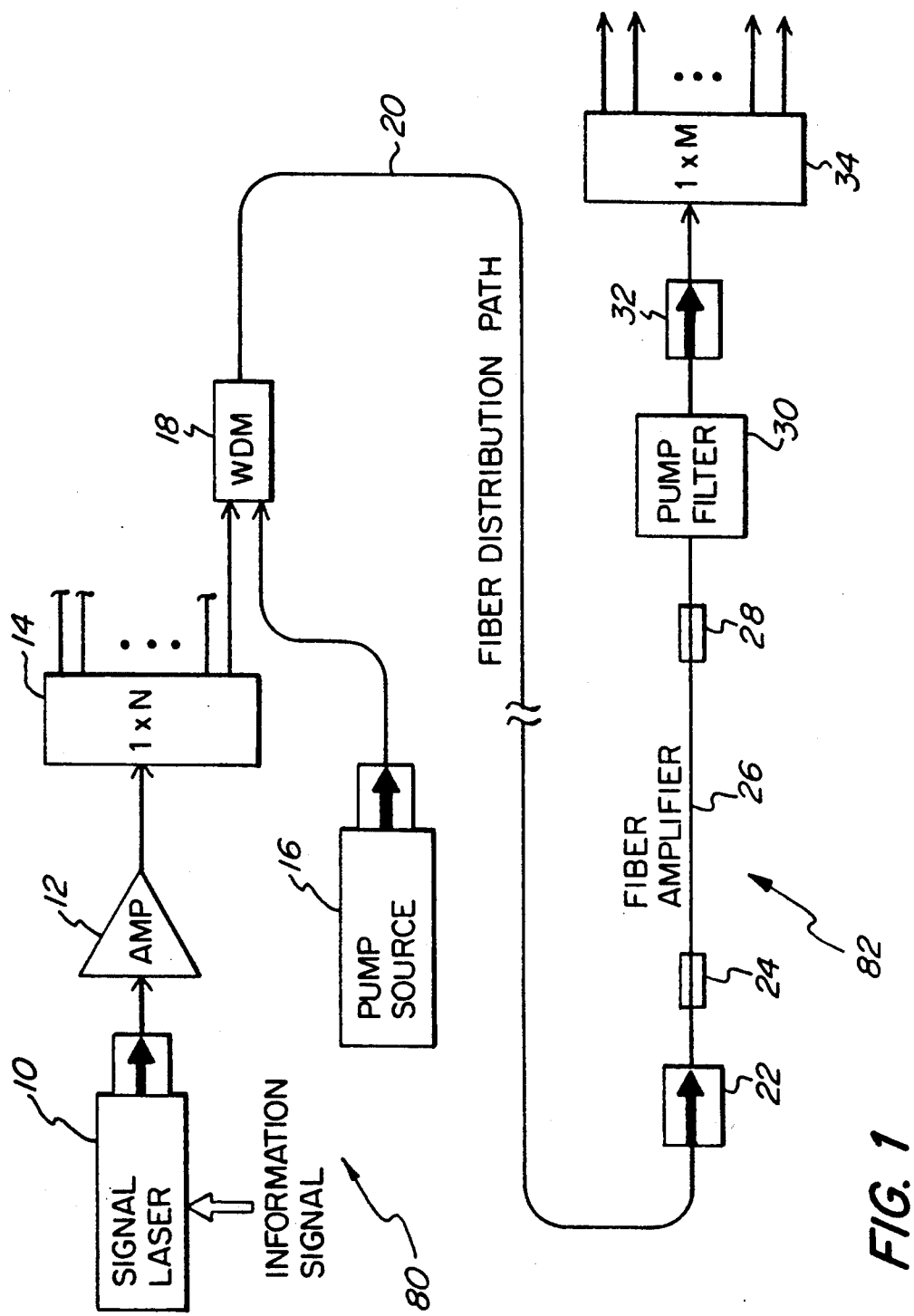
FIG. 1 is a schematic diagram illustrating a first embodiment of the present invention in which pump energy is transmitted down a fiber distribution path with an information signal.

A first embodiment of a communication system in accordance with the present invention is illustrated in FIG. 1. Both a signal laser 10 and a pump source 16 are provided at a central site 80, such as a cable television headend. Signal laser 10 is modulated with an information signal (e.g., television program signals) and outputs a modulated optical carrier for amplification by an optical amplifier 12. The amplified optical signal is split into a plurality "N" of optical signal paths by a conventional optical splitter 14. Pump source 16 outputs pump energy for one or more downstream optical amplifiers and/or other active optical devices contained in a fiber distribution path 20. The signal wavelength output from splitter 14 and pump wavelength from pump source 16 are combined in a conventional wave division multiplexer 18 and propagated along the fiber distribution path 20 until they reach an active optical device such as an optical amplifier generally designated 82. The pump energy from pump source 16 is provided at a wavelength which will pump the particular optical amplifier(s) 82 or other active devices that are provided along the distribution path. For example, each optical amplifier 82 can comprise a rare earth doped optical fiber amplifier 26 such as an erbium doped fiber amplifier. In such a case, pump source 16 will advantageously output pump energy at a wavelength of 1480 nanometers. It has been demonstrated that thulium has a transition at 1.46 $\mu$m, and a thulium doped fiber pumped at 0.79 $\mu$m, for example, can be used to provide the pump source. See, e.g., R. Allen, L. Esterowitz and I. Aggarwal, CLEO 1992, Paper CThQ4, for a discussion of the 1.47 $\mu$m transition of thulium. A superluminescent source that is particularly suited for use as the pump 16 is disclosed in commonly assigned, copending U.S. patent application Ser. No. 07/919,922 filed concurrently herewith by the same inventor and entitled "Superluminescent Optical Source." Those skilled in the art will appreciate that while a superluminescent source is not usually a laser, it will function in a similar manner to provide pump energy to an active optical device.

The provision of a source that does not lase is required for pump energy that is to be communicated over an appreciable distance, so that the Brillouin threshold will not be reached. Stimulated Brillouin scattering is the first fiber non-linearity that results as the power in a fiber is increased.

Since Brillouin threshold is a function of pump spectral density, high power can be transmitted if the pump light has a moderately broad spectrum. Typical Brillouin gain bandwidths are 40 MHz to 100 MHz. If the optical bandwidth of the pump is significantly wider than 40 MHz to 100 MHz, the Brillouin threshold as a function of transmitted pump power can be greatly increased. In the aforementioned copending patent application for a superluminescent optical source, a grating (e.g., a fiber grating) is used to limit the spectrum of the source, while retaining efficient power conversion. It is desirable to limit the spectrum of the superluminescent source when it is used to pump an optical amplifier, since the noise figure of an optical amplifier is dependent on the wavelength of the pump light. The source linewidth is derived from the bandwidth of the grating. Thus, when the pump is used to pump devices a significant distance away, it is desirable to use a grating having a moderately wide optical bandwidth to keep the spectral density below the Brillouin spectrum.

Prior to introducing the signal and pump energy carried on path 20 to doped optical fiber 26, the combined signal and pump energy are passed through a conventional optical isolator 22. Conventional fiber couplers 24, 28 are used to couple the doped fiber 26 into the fiber distribution path 20. Rare earth doped optical fiber amplifiers appropriate for use in connection with the present invention are well known in the art. See, for example, U.S. Pat. No. 5,027,079 to Desurvire, et al. entitled "Erbium-Doped Fiber Amplifier."

In the present invention, doped optical fiber 26 is excited by the pump energy received from pump source 16 via fiber distribution path 20. At the same time, the information signal carried via fiber distribution path 20 passes through the doped fiber 26, and is amplified due to the gain in the excited doped fiber. By transmitting the pump energy from a remote location via the fiber distribution path 20, the need to provide a local pump laser with amplifier 82 is avoided. The optical amplifier 82 can be installed within the fiber distribution path in the same manner as a passive component, thereby increasing reliability while decreasing cost.

A pump filter 30 is provided at the output of optical amplifier 82 to remove any excess pump energy that remains in the fiber distribution path at that point. Those skilled in the art will appreciate that if a plurality of fiber amplifiers are provided along the fiber distribution path, the pump filter 30 will be provided after the last such amplifier only. An optical isolator 32 is also provided at the output of optical amplifier 82 in a conventional manner. The amplified signal is input to a conventional splitter 34 for distribution of the information signal to a plurality of receivers.

Figure 2:
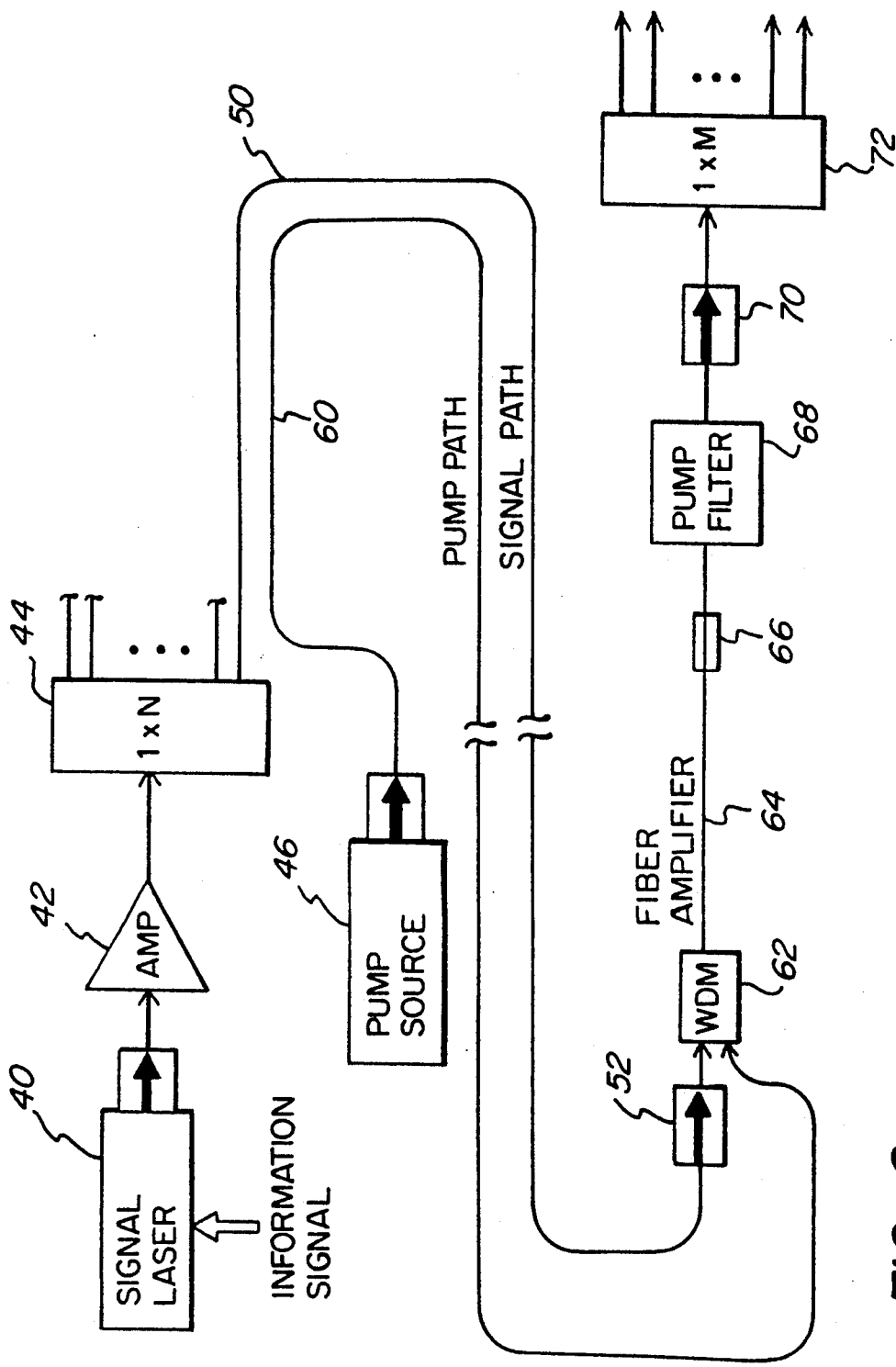
FIG. 2 is a schematic diagram illustrating an alternate embodiment of the present invention in which a separate pump path is provided for the pump energy.

FIG. 2 illustrates an alternate embodiment of the invention, in which a separate pump path is provided for the downstream optical amplifier(s). A signal laser 40 provides an optical carrier modulated by an information signal. Optical amplifier 42 amplifies this signal prior to a splitter 44. Each output from the splitter comprises a signal path for distributing the information signal to a plurality of receivers. One such signal path 50 is illustrated. A pump source 46, which is typically located at a central site with the signal laser 40, provides pump energy along a dedicated pump path 60. In a preferred embodiment, the pump path and signal path will parallel each other and can comprise two different fibers in the same optical cable.

At a point along the distribution path where the information signal needs to be processed (e.g., amplified), an active optical device such as an embodiment, the signal path is coupled to an optical isolator 52, and then the information signal carried by the signal path is combined with the pump energy from the pump path in a wave division multiplexer 62. The output of multiplexer 62 is coupled, e.g., to a rare earth doped fiber amplifier 64, which operates in the same manner as the doped fiber amplifier discussed in connection with FIG. 1. A standard coupler 66 couples the output of the doped fiber into the distribution path. A pump filter 68 and optical isolator 70 are provided at the output of the optical amplifier as discussed in connection with FIG. 1. The information signal is then split in an optical splitter 72 and distributed to a plurality of receivers.

Figure 3:
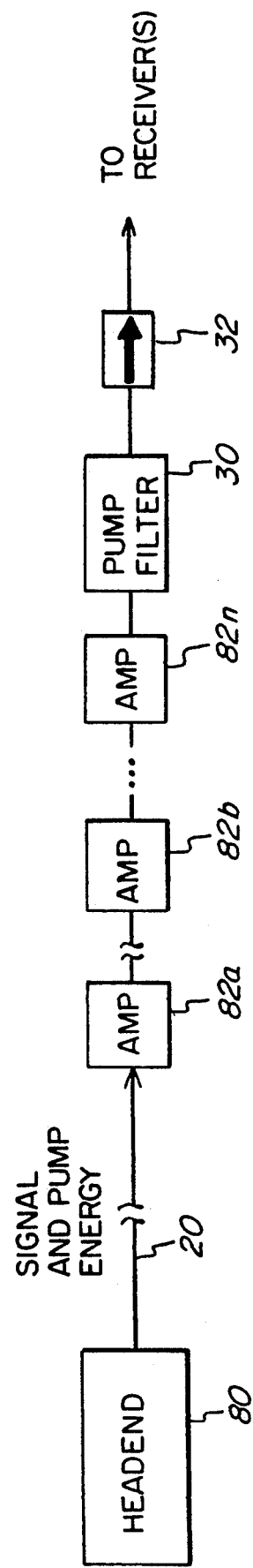
FIG. 3 is a schematic diagram illustrating the provision of a plurality of optical amplifiers spaced along and receiving pump energy from the optical distribution path.

As noted above, a plurality of optical amplifiers and/or other active devices provided along an optical distribution path can be pumped by a common, remotely located pump source in accordance with the present invention. Such an embodiment is illustrated in FIG. 3. Headend 80 outputs the information signal and pump energy on fiber distribution path 20 as described above in connection with FIG. 1. A plurality of active devices, such as optical amplifiers 82a, 82b, ... 82n are provided along the distribution path. It should be appreciated that the plurality of devices can be distributed along a single path or various paths, all served by a common pump source. Each optical amplifier 82a, 82b, ... 82n can comprise an optical isolator 22, couplers 24, 28, and rare earth doped fiber 26 as illustrated in FIG. 1. Pump filter 30 and optical isolator 32 are provided at the output of the last optical amplifier 82n in the distribution run. The information signal output from optical isolator 32 is provided to one or more receivers in a conventional manner.

It should now be appreciated that the present invention provides a scheme for remotely pumping active optical devices such as optical amplifiers along a distribution path. A single pump source provided at a central site, such as a cable television headend, supplies energy either via the information signal distribution path or a separate pump path to each of the active optical devices in the distribution line. This scheme obviates the need to provide separate pump sources at each active optical device along the distribution path.

Although the invention has been described in connection with several specific embodiments, those skilled in the art will appreciate that numerous adaptations and modifications may be made thereto without departing from the spirit and scope of the invention as set forth in the claims.

I claim:

1. Apparatus for distributing signals from a signal origination site to a distant user site over an optical fiber communication path comprising:
   means for coupling an optical information signal to said communication path at said signal origination site for distribution over said path;
   an active optical device within said communication path at a remote downstream location from said coupling means;
   a pump source situated at a pump site that is a substantial distance from the location of said active optical device for outputting pump energy to remotely excite said active optical device from said pump site;
   an optical fiber pump path separate from said communication path and running from said pump site to said active optical device, said pump path having a first end coupled to said pump source and a second end coupled to said active optical device to pump the active optical device independent of said signal path;
   wherein said pump energy travels from said pump site over said pump path to reach said active optical device said substantial distance away.

2. Apparatus in accordance with claim 1 wherein a plurality of active optical devices are spaced at different sites along said communication path for remote pumping from said pump site by a common pump source via said pump path.

3. Apparatus in accordance with claim 2 wherein said active optical devices are rare earth doped optical fiber amplifiers.

4. Apparatus in accordance with claim 3 wherein said amplifiers are erbium doped and said pump energy has a wavelength of about 1480 nanometers.

5. Apparatus in accordance with claim 2 wherein said pump site is located at said signal origination site.

6. Apparatus in accordance with claim 5 wherein said pump path parallels said communication path.

7. Apparatus in accordance with claim 1 wherein said pump site is located at said signal origination site.

8. Apparatus in accordance with claim 7 wherein said pump path parallels said communication path.

9. Apparatus in accordance with claim 1 further comprising means for filtering the information signal downstream from said active optical device to remove pump energy therefrom.

10. Apparatus in accordance with claim 1 wherein a plurality of active optical devices in different communication paths are remotely pumped from said pump site by a common pump source via said pump path.

* * * * *